United States Patent
Zmievski et al.

(10) Patent No.: US 9,998,348 B2
(45) Date of Patent: Jun. 12, 2018

(54) MONITORING A BUSINESS TRANSACTION UTILIZING PHP ENGINES

(71) Applicant: AppDynamics LLC, San Francisco, CA (US)

(72) Inventors: Andrei Zmievski, San Francisco, CA (US); Christopher Brichford, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 14/448,916

(22) Filed: Jul. 31, 2014

(65) Prior Publication Data

US 2016/0034326 A1 Feb. 4, 2016

(51) Int. Cl.
*G06F 15/173* (2006.01)
*H04L 12/26* (2006.01)
*G06F 11/34* (2006.01)
*H04L 12/24* (2006.01)

(52) U.S. Cl.
CPC .............. *H04L 43/10* (2013.01); *G06F 11/34* (2013.01); *G06F 11/3495* (2013.01); *H04L 41/5009* (2013.01); *G06F 2201/865* (2013.01)

(58) Field of Classification Search
CPC ...... H04L 43/10; H04L 41/5009; G06F 11/34; G06F 11/3495; G06F 2201/865
USPC ........................................................ 709/224
See application file for complete search history.

(56) References Cited

U.S. PATENT DOCUMENTS

| | | | | |
|---|---|---|---|---|
| 6,738,965 | B1* | 5/2004 | Webster | G06F 11/3636 714/E11.212 |
| 2003/0041316 | A1* | 2/2003 | Hibbeler | G06F 11/3423 717/130 |
| 2005/0268309 | A1* | 12/2005 | Krishnaswamy | G06F 9/548 719/330 |
| 2009/0049429 | A1* | 2/2009 | Greifeneder | G06F 11/3495 717/128 |
| 2010/0088683 | A1* | 4/2010 | Golender | G06F 9/4446 717/128 |
| 2010/0251263 | A1* | 9/2010 | Coelho | G06F 11/3433 719/314 |
| 2010/0262956 | A1* | 10/2010 | Okada | G06F 8/24 717/166 |
| 2013/0185643 | A1* | 7/2013 | Greifeneder | H04L 67/22 715/736 |
| 2015/0032884 | A1* | 1/2015 | Greifeneder | H04L 67/10 709/224 |

(Continued)

*Primary Examiner* — James E Springer
(74) *Attorney, Agent, or Firm* — Parker Ibrahim & Berg LLP; James M. Behmke; Stephen D. LeBarron

(57) ABSTRACT

An agent executing on a server identifies a function provided from a PHP library and executed by a PHP server and monitors the function. The present system places an interceptor on a first function in order to the identity of a second function. The second function may be identified from the first function return value from the route object, argument, PHP program state, or some other part of the execution environment at the time the first function is intercepted. From the data analyzed at the time the first function is intercepted, the present system identifies the second function which is also modified with an interceptor. The second function is monitored via the interceptor to determine performance and is associated with a business transaction.

21 Claims, 6 Drawing Sheets

(56) References Cited

U.S. PATENT DOCUMENTS

2015/0058825 A1* 2/2015 Madampath ........ G06F 11/3636
717/128

* cited by examiner

MONITORING A BUSINESS TRANSACTION UTILIZING PHP ENGINES

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. As more and more businesses rely on a network presence to conduct business, the efficiency and reliability of these web services that they provide becomes more important. Monitoring some applications, such as PHP applications, has proven difficult when trying to provide performance information for business transaction that involves PHP engines. In particular, it can be difficult to track a PHP application function when libraries are used to return functionality to an application to carry out as part of the business transaction.

What is needed is an improved method for determining performance of a web based service that involves a PHP engine.

SUMMARY

The present technology identifies a function provided from a PHP library and monitors the function. The present system places an interceptor on a first function in order to determine the identity of a second function. The second function may be identified from data such as the first function return value from the route object, argument, PHP program state, or some other part of the execution environment at the time the first function is intercepted. From the data analyzed at the time the first function is intercepted, the present system identifies the second function which is also modified with an interceptor. The second function is monitored via the interceptor to determine performance and is associated with a business transaction.

An embodiment may include a method for monitoring a business transaction. A first PHP function may be detected. A data structure for the first PHP function may be annotated. A part of an execution environment is detected for subsequent executions of first PHP function. A data structure for a second PHP function and associated with the part of an execution environment is then annotated. The second PHP function is then monitored.

An embodiment may include a system for monitoring a business transaction. The system may include a processor, a memory and one or more modules stored in memory and executable by the processor. When executed, the one or more modules may detect a first PHP function, annotate a data structure for the first PHP function, detect a part of an execution environment for subsequent execution of first PHP function, annotate a data structure for second PHP function associated with the part of an execution environment, and monitor the second PHP function.

DETAILED DESCRIPTION

The present technology identifies a function provided from a PHP library and monitors the function. The present system places an interceptor on a first function in order to determine the identity of a second function. The second function may be identified from data such as the first function return value from the route object, argument, PHP program state, or some other part of the execution environment at the time the first function is intercepted. From the data analyzed at the time the first function is intercepted, the present system identifies the second function which is also modified with an interceptor. The second function is monitored via the interceptor to determine performance and is associated with a business transaction.

The present technology is discussed herein with respect to a function. It should be understood that the present technology may be used with functions, methods, or any other body of code that may be called within a program such as a PHP program.

Figure 1:
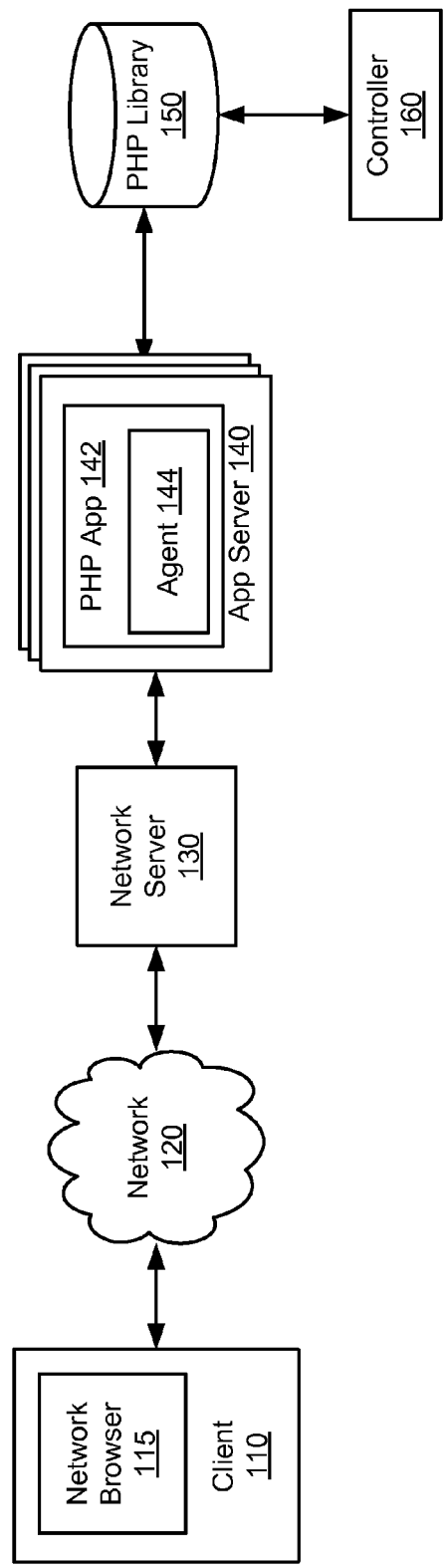
FIG. 1 is a block diagram of a system for performing the present technology.

FIG. 1 is a block diagram of a system for implementing the present technology. The system of FIG. 1 includes client 110, network 120, network server 130, application server 140, PHP library 150, and controller 160.

Client 110 may include any device through which a user may initiate a request over network 120 to servers 130-144. Client device 110 may include network browser 110 and be implemented as a computing device, such as for example a laptop, desktop, workstation, or some other computing device. Client device 110 may be implemented as a portable device, such as for example a mobile phone, smart phone, or other portable device. Client device 110 may include hardware and/or software configured to access a web service provided by network server 120.

Network 120 may be used to receive and process communication, including requests and responses, between client 110 and network server 130. In some embodiments, network 120 may also exist between other machines of FIG. 1, such as for example between network server 130 and application server 140, or between application server 140 and PHP server 150. Network 120 may include any public or private network for communicating data, such as for example a local area network, a wide area network, the internet, an intranet, a wireless network, a cellular network, or a combination of these networks.

Network server 130 may receive and process requests received from client 110 over network 120. Network server 130 may be implemented by the same machine or a different machine as application server 140. In some embodiments, a network server 130 may be an actual device or a logical device that processes requests and forwards requests or generates new requests to application server 140 to be serviced and returned to client 110.

Application server 140 may communicate with network server 130, PHP library 150 and controller 160, and may include one or more PHP applications 142. Application server 140 may be implemented on the same machine or a different machine as network server 130 and may include one or more PHP applications or engines monitored by one or more agents 144. A PHP engine may execute inside an application server, such as an "Apache" web server, and handle each application server process which handles a request. A PHP engine may operate to access a PHP script, parse the script, and execute the script. While executing the script, resources may be utilized based on the script commands, HTML may be generated, and the HTML is transmitted back to the requesting entity, such as a network browser, as part of processing the request.

A PHP engine may include a ZEND engine having a memory pool 312. A ZEND engine includes a memory pool and executes PHP scripts. At the start of a request, the memory pool creates a memory segment which is used by a script during execution. Each PHP process handled by the application server is associated with a ZEND engine and a memory pool.

An agent may track resource usage associated with a business transaction being processed by PHP application 142. The resource usage may be tied to a business transaction to give better visibility of business transaction metrics than typical associations by URL.

PHP library 150 may reside on one or more data stores and may receive requests from application server 140. PHP engine 150 may process the request and transmit a response to the requesting server.

Controller 160 may receive data from application server 140 and manage monitoring of business transactions distributed over application servers. Controller 160 may receive runtime data generated from aggregated metrics from an agent in each of one or more application servers, associate portions of business transaction data, communicate with agents to configure collection of runtime data, and provide performance data and reporting through an interface. Controller 190 may install an agent into one or more application servers.

Figure 2:
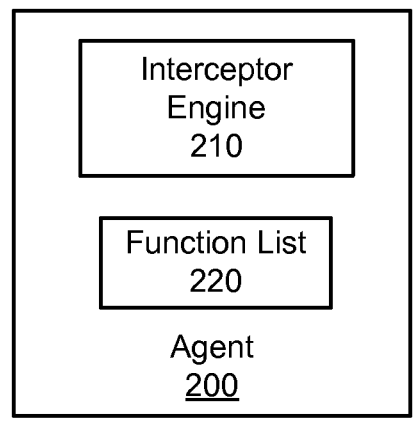
FIG. 2 is a block diagram of an agent for monitoring a PHP application.

FIG. 2 is a block diagram of an agent for monitoring a PHP application. Agent 200 of FIG. 2 may include an interceptor engine 210 and a mapping file 220. Interceptor engine may apply interceptors to requests handled by PHP application 142. Function list 220 may list one or more functions to be traced with an interceptor. Use of the function list is discussed in more detail below.

Figure 3:
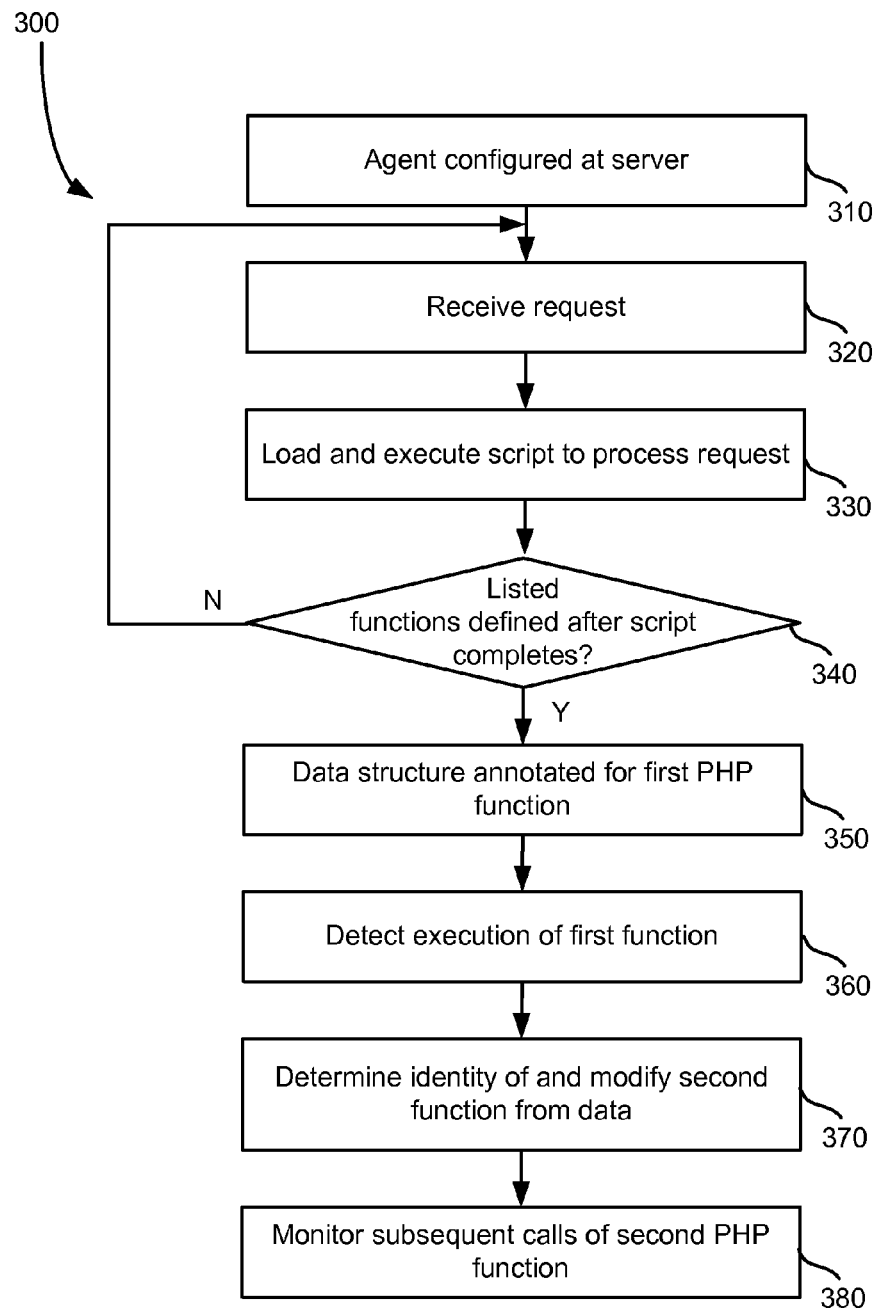
FIG. 3 illustrates a method for monitoring PHP functions.

FIG. 3 illustrates a method for monitoring PHP functions. First, an agent is configured at a server at step 310. The agent is configured on the server to monitor a PHP engine, manage interceptors in PHP functions, and report data to a controller.

A request is received at step 320. The request may be from a browser, remote application, or another node. A script to process the request is loaded and executed at step 330. The script may include a root script executed in response to receiving the request as well as one or more other scripts executed by the root script as part of processing the request.

A PHP program is composed of a set of PHP files. The program starts in a PHP file referenced by a request to a web server or a PHP file passed to the PHP command line interpreter—the root PHP file for the PHP program. Any PHP file including the root PHP file may reference other PHP files as the PHP file executes. All the PHP files that are ultimately referenced directly or indirectly by the root PHP file are part of the same PHP program. When a PHP file references another file, execution of the referencing PHP file is suspended and execution of the referenced PHP file begins. Once the referenced PHP file finishes executing, the referencing PHP file resumes execution.

A determination may be made as to whether one or more functions contained in a list are defined after a script completes at step 340. In some instances, the determination may be made after execution for each script in a program completes, including root scripts and other scripts. If no functions are defined after each script completes, the method returns to step 320. If any function is defined after execution of a script at step 340, the method of FIG. 3 continues to step 350.

A data structure is annotated for a defined PHP function at step 350. The data structure may be defined based on whether the structure is an oparray or internal function. More details for annotating a data structure are provided with respect to FIG. 4.

Execution of a first function is detected at step 360. An identity of a second function is determined from data and the function is modified at step 370. The data may include data from the execution environment when the first function is intercepted. Determining the identity of the second function and modifying the second function is discussed in more detail with respect to the method of FIG. 5.

Subsequent calls of a second PHP function are monitored at step 380. The subsequent calls may be detected once the identity of the function is known and a data structure for the function is modified with interceptors. The interceptors may alert an agent when the second function starts and ends, thereby allowing the agent to determine the performance of the second function. For example, the agent may determine if the call completed, the performance metrics for handling the call such as response time for handling the call, as well as if the call returned an exception.

Figure 4:
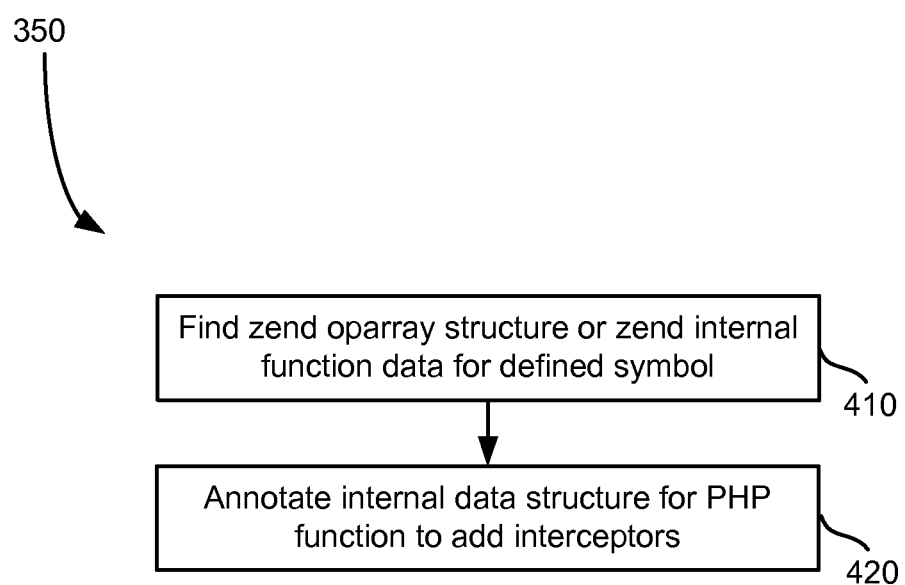
FIG. 4 illustrates a method for annotating a data structure for a first PHP function.

FIG. 4 illustrates a method for annotating a data structure for a first PHP function. First, an intercept engine may identify the zend oparray structure or the zend internal function data for that defined symbol at step 410. The zend oparray structure or zend internal function data will be maintained for different instances of the particular request. The data structure associated with the defined method and class is annotated at step 420. The annotation to the structure results in the addition of interceptors to the data structure associated with the symbol and stored on the map.

Figure 5:
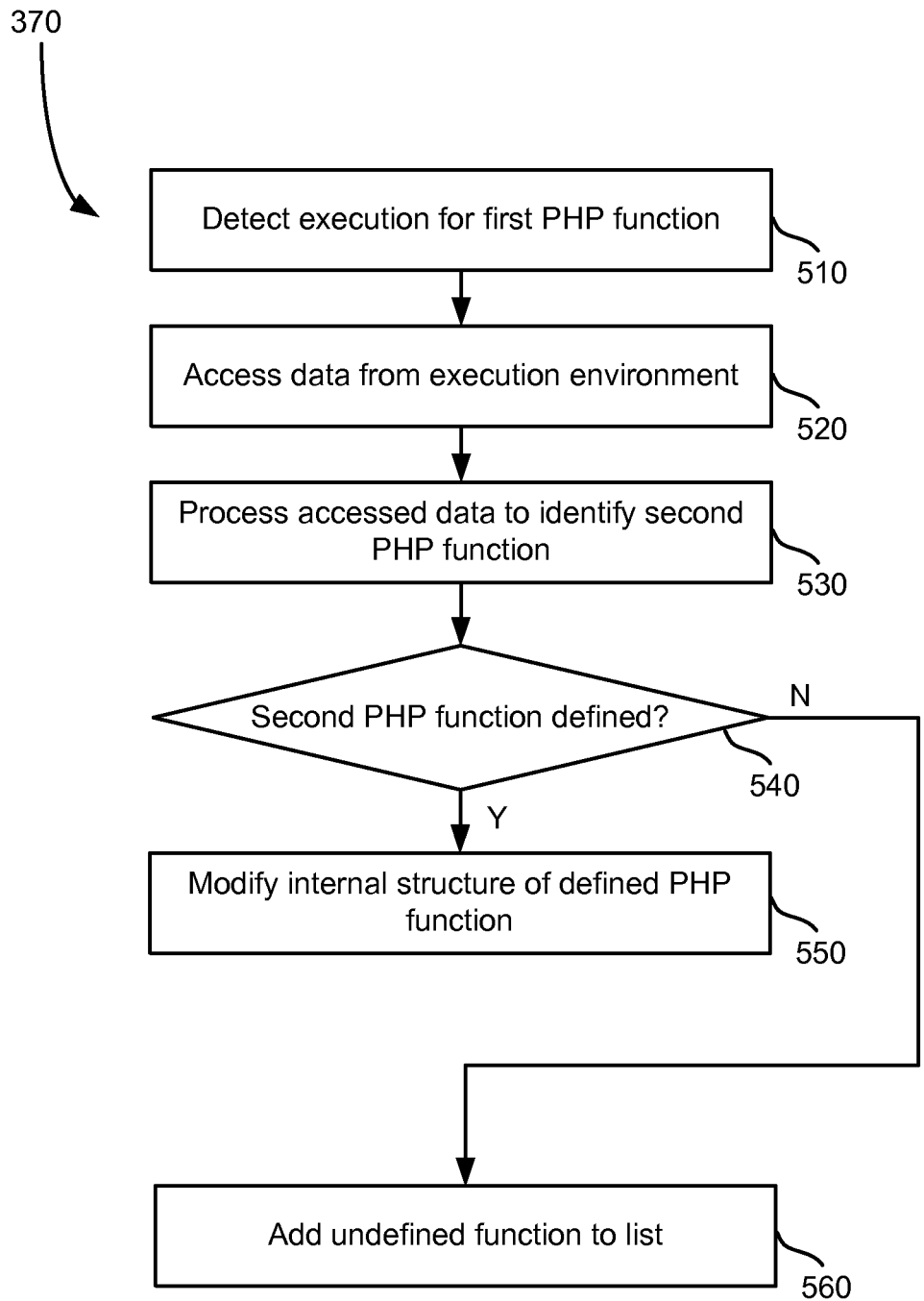
FIG. 5 illustrates a method for determining an identity of and modifying a second function.

FIG. 5 illustrates a method for determining an identity of and modifying a second function. The execution of a first PHP function is detected at step 510. Data from the execution environment may be accessed at step 520. The data may include the first function return value from the route object, an argument, a PHP program state, or some other part of the execution environment at the time the first function is intercepted. The accessed data may be processed to identify a second PHP function at step 530. The processing may include retrieving the name of the second function from the data.

A determination may be made as to whether the second PHP function is defined at step 540. The second PHP function identified at step 530 may be defined if the function has been executed and the data structure for the function has been created. If the function has not been defined, the undefined function is added to the list of functions to check against after scripts have completed execution (see step 340 of FIG. 3) at step 560.

If the function has been defined, the internal data structure for the defined function is annotated at step 550. In some instances, as a PHP file executes, it can define functions and classes. PHP functions can be called by PHP files and other functions. An interception engine annotates the internal data structures the PHP interpreter maintains for functions and methods to mark those important functions as needing interception. The interception engine annotates the internal data structure for each PHP file such that the interception engine will be notified each time a PHP file finishes executing. When any PHP file finishes execution, the interception engine searches the PHP interpreter's symbol table (an internal data structure that maps the name of a function to the internal data structure for that function) to find an important functions or methods whose internal data structures have not yet been modified. The internal data structure for a PHP function, method, or file that is modified is known as an "op_array" in the PHP interpreter's source code. Hence, the data structure may be modified with interceptors which notify an agent when function execution begins and ends.

Figure 6:
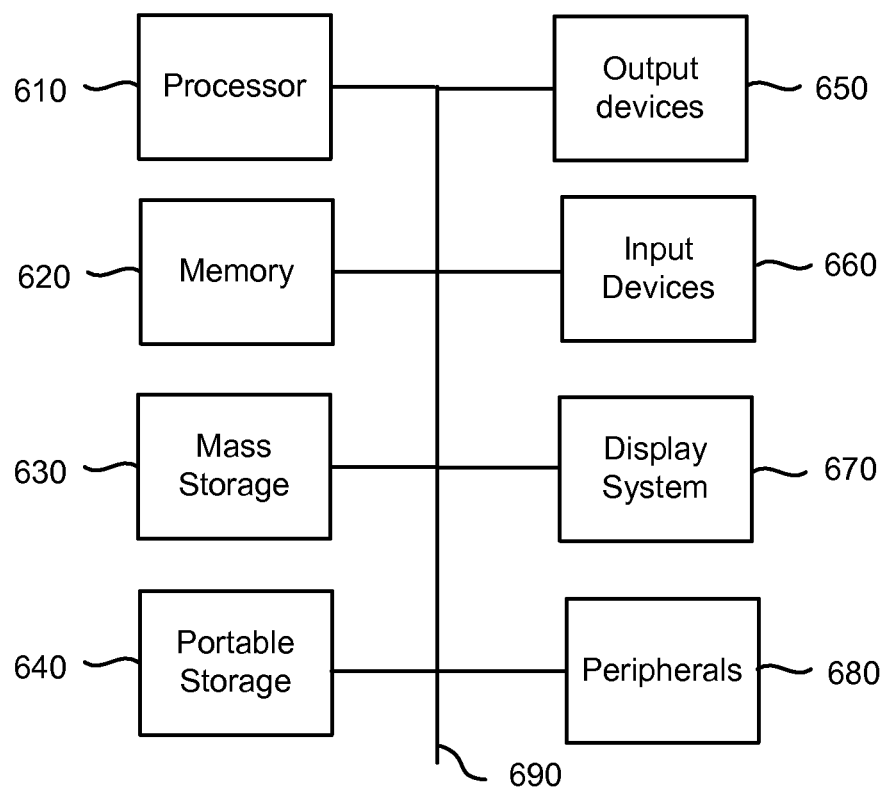
FIG. 6 is a system for implementing the present technology.

FIG. 6 is a block diagram of a computer system for implementing the present technology. System 600 of FIG. 6 may be implemented in the contexts of the likes of client 110, network server 130, application server 140, PHP Library 150, and controller 160. A system similar to that in FIG. 6 may be used to implement a mobile device such as a smart phone, which may implement client 110, but may include additional components such as an antenna, additional microphones, and other components typically found in mobile devices such as a smart phone or tablet computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a call, comprising:
receiving, at a server in a computer network configured with an agent, a request from a device in the computer network to execute one or more functions associated with a PHP application, wherein the agent includes an interceptor engine and a function list;
determining, by the interceptor engine, whether any one of the one or more functions are contained within the function list;
in response to determining that at least one function of the one or more functions is contained in the function list, detecting, by the interceptor engine, a first PHP function to be annotated;
annotating a data structure of the first PHP function to include a first interceptor to identify a second function in the first PHP function;
intercepting, by the intercepting engine, a return value for subsequent execution of the first PHP function;
in response to intercepting the return value, identifying, by the interceptor engine, the second function that requires modification in order to be monitored;
annotating a data structure for the second PHP function to include a second interceptor to identify the second function in the PHP application; and
monitoring, via the interceptor engine, the second PHP function.

2. The method of claim 1, wherein the function list is a list of one or more functions that are to be monitored with via the interceptor engine.

3. The method of claim 1, further comprising:
identifying a first PHP method and class from a PHP library; and
adding a method and class to the function list, the first PHP function associated with the method and class.

4. The method of claim 1, wherein annotating the first PHP function includes configuring the first interceptor in the data structure of a call.

5. The method of claim 1, wherein the agent associates the first and second PHP function with a same business transaction.

6. The method of claim 1, wherein the agent is configured to monitor the PHP application, manage the interceptor engine and report data to a controller on a remote server.

7. The method of claim 1, further comprising:
receiving, by the interceptor engine, a return value from the second PHP function;
identifying, by the interceptor engine, a symbol associated with the return value from the second PHP function; and
identifying, by the interceptor engine, the second PHP function from the symbol in the function list.

8. A non-transitory computer readable storage medium having embodied thereon a program, the program being executable by a processor to perform a method for monitoring a call, the method comprising:
receiving, at a server in a computer network configured with an agent, a request from a device in the computer network to execute one or more functions associated with a PHP application, wherein the agent includes an interceptor engine and a function list;
determining, by the interceptor engine, whether any one of the one or more functions are contained within the function list;
in response to determining that at least one function of the one or more functions is contained in the function list, detecting, by the interceptor engine, a first PHP function to be annotated;
annotating a data structure of the first PHP function to include a first interceptor to identify a second function in the first PHP function;
intercepting, by the intercepting engine, a return value for subsequent execution of the first PHP function;
in response to intercepting the return value, identifying, by the interceptor engine, the second function that requires modification in order to be monitored;
annotating a data structure for the second PHP function to include a second interceptor to identify the second function in the PHP application; and
monitoring, via the interceptor engine, the second PHP function.

9. The non-transitory computer readable storage medium of claim 8, wherein the function list is a list of one or more functions that are to be monitored with via the interceptor engine.

10. The non-transitory computer readable storage medium of claim 8, further comprising:
identifying a first PHP method and class from a PHP library; and
adding a method and class to the function list, the first PHP function associated with the method and class.

11. The non-transitory computer readable storage medium of claim 8, wherein annotation of the first PHP function includes configuring the first interceptor in the data structure of a call.

12. The non-transitory computer readable storage medium of claim 8, wherein the agent associates the first and second PHP function with the a same business transaction.

13. The non-transitory computer readable storage medium of claim 8, wherein the agent is configured to monitor the PHP application, manage the interceptor engine and report data to a controller on a remote server.

14. The non-transitory computer readable storage medium of claim 8, the method further comprising:
receiving, by the interceptor engine, a return value from the second PHP function;
identifying, by the interceptor engine, a symbol associated with the return value from the second PHP function; and
identifying, by the interceptor engine, the second PHP function from the symbol in the function list.

15. An apparatus comprising:
one or more network interfaces to communicate with a computer network;
a processor coupled to the one or more network interfaces and configured to execute a process; and
a memory configured to store program instructions which include the process executable by the processor, the process configured to:
receive, via an agent, a request from a device in the computer network to execute one or more functions associated with a PHP application, wherein the agent includes an interceptor engine and a function list;
determine, by the interceptor engine, whether any one of the one or more functions are contained within the function list;
in response to a determination that at least one function of the one or more functions is contained in the function list, detect, by the interceptor engine, a first PHP function to be annotated;
annotate a data structure of the first PHP function to include a first interceptor to identify a second function in the first PHP function;
intercept, by the intercepting engine, a return value for subsequent execution of the first PHP function;
in response to intercept the return value, identify, by the interceptor engine, the second function that requires modification in order to be monitored;
annotate a data structure for the second PHP function to include a second interceptor to identify the second function in the PHP application; and
monitor, via the interceptor engine, the second PHP function.

16. The system of claim 15, wherein the function list is a list of one or more functions that are to be monitored with via the interceptor engine.

17. The system of claim 15, wherein the process is further configured to:
identify a first PHP method and class from a PHP library, and
add a method and class to the function list, the first PHP function associated with the method and class.

18. The system of claim 15, wherein annotating the first PHP function includes configuring an interceptor in the data structure of a call.

19. The system of claim 15, wherein the agent associates the first and second PHP function with the a same business transaction.

20. The system of claim 15, wherein the agent is configured to monitor the PHP application, manage the interceptor engine and report data to a controller on a remote server.

21. The system of claim 15, wherein the process is further configured to:
receive the part of an execution environment from the second PHP function,
identify a symbol associated with the part of an execution environment, and
identify the second PHP function from the symbol.

* * * * *